UNITED STATES PATENT OFFICE

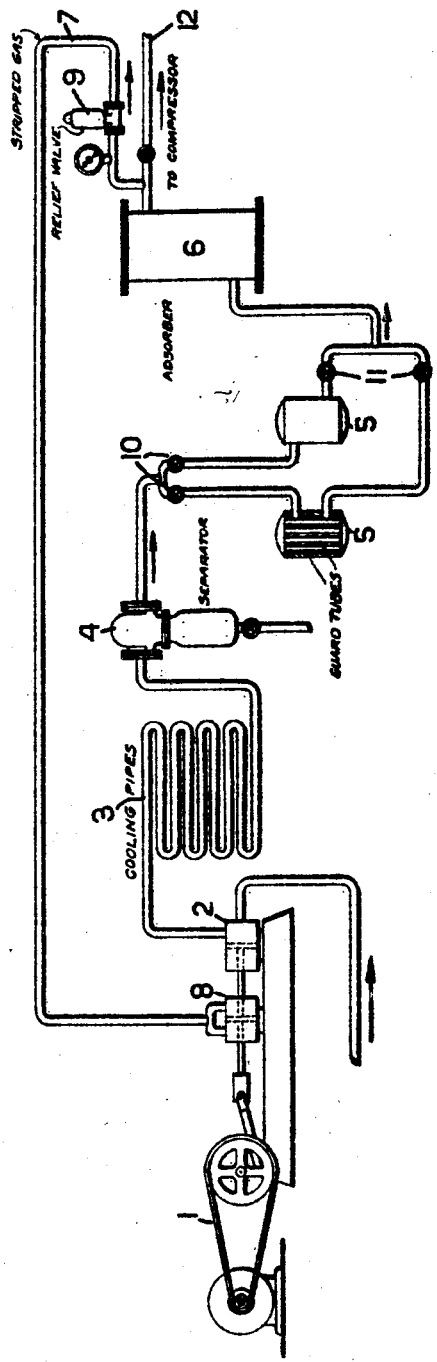

RUDOLPH LEONARD HASCHE, OF ELIZABETH, NEW JERSEY, ASSIGNOR TO AMERICAN SMELTING AND REFINING COMPANY, OF NEW YORK, N. Y., A CORPORATION OF NEW JERSEY

SEPARATION OF GASES

Application filed November 12, 1927. Serial No. 232,939.

This invention relates to the separation and recovery of gases and vapors from a mixture thereof, and more particularly to a method of adsorbing and liberating gases by means of a solid adsorption material.

Various solid adsorption materials such as silica gel, activated charcoal, iron oxide gel and alumina are capable of selectively adsorbing and removing various gaseous substances from mixtures in which these substances are present in varied proportions. In order, however, to drive off the adsorbed gases from the adsorption material it is necessary to subject the same to conditions differing from those under which adsorption occurred.

The present invention relates to a method of treating adsorption material in which the temperature is maintained constant for both the adsorption and desorption steps, the required properties being obtained by varying the pressure of the gases within the material. The process may, therefore, be described as substantially isothermal and utilizes the property of the adsorptive material whereby the amount of gases held therein is substantially proportional to the pressure of the adsorbed gaseous constituents.

It has been found, however, that an adsorbent material utilized as above, adsorbs from the gas stream, water vapor and various impurities which must be periodically removed. The water vapor may be driven off by heating, but when the accumulation of certain impurities becomes sufficiently great, the adsorbent material must be replaced.

In accordance with the present invention, the adsorbent material is protected from water vapor and impurities whereby frequent replacement, or other treatment, such as heating, is eliminated. This is accomplished by interposing an auxiliary bed of adsorbent material in the gas stream ahead of the main body of adsorbent. A sufficient quantity is utilized for adsorbing moisture and impurities, although the total amount of adsorbent employed is maintained small compared to that of the main adsorbent bed in order to reduce the cost of replacement.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood, however, that the processes and the steps thereof may be modified in various respects without departing from the broad spirit and scope of the invention.

In the drawing accompanying and forming part of this specification the figure is a diagrammatic illustration of a type of apparatus which may be employed in carrying on the present process.

In the following description and in the claims the various steps in the process and the details comprising the invention will be identified by specific names for convenience but they are intended to be as generic in their application as the art will permit.

The process in accordance with the present invention is based upon certain well known and established principles of behavior of gaseous substances. For example, in accordance with the law of partial pressures, in a mixture of gases, each gas exerts the same pressure as it would exert if it were alone present in the volume occupied by the gas mixture. Furthermore, the solubility of a gas contained in a gas mixture depends upon the partial pressure of that gas.

Considering these two gas laws, it is evident that the ability of an adsorbent to dissolve a certain gas from a mixture in which it is contained, is dependent entirely upon the pressure of that gas in said mixture and is not dependent upon the relative purity thereof. Assuming that the temperature is maintained constant, the amount of gas removed from the mixture will be proportional to the pressure which is maintained on the adsorbing material and the rate at which the adsorbed gas is liberated at reduced pressure will depend upon the difference between the adsorption and desorption pressures.

Considering, for example, a gas mixture which contains, at atmospheric pressure, 10 percent of a particular gaseous ingredient such as sulphur dioxide, it is evident that the sulphur dioxide itself will exert a pressure of one-tenth of an atmosphere and that the adsorbent material will adsorb the same amount thereof from an air mixture containing 10 percent of sulphur dioxide as from a pure sulphur dioxide at the same partial pressure, namely, one-tenth of an atmosphere. As a further example, the adsorbent material should adsorb approximately as much sulphur dioxide from a gas mixture containing 10 percent of sulphur dioxide by volume at a pressure of 20 atmospheres as from pure sulphur dioxide at a pressure of 2 atmospheres.

It is evident from the above that by maintaining the pressure of a gaseous mixture containing 10 percent sulphur dioxide at approximately 20 atmospheres during the adsorption process and subsequently reducing the pressure to atmospheric, approximately half the adsorbed sulphur dioxide will be liberated. By reducing the pressure below atmospheric, a greater proportion thereof may be desorbed and recovered.

In carrying on this process, a gaseous substance such as, for example, sulphur dioxide, nitrogen dioxide, carbon dioxide, chlorine and others may be adsorbed by a suitable material such as silica gel, activated charcoal, iron oxide gel or alumina, and may be liberated from said material and recovered by merely changing the pressures preferably while the temperature is maintained constant.

The invention will be described as applied to the recovery of sulphur dioxide from smelter gases by the use of silica gel as an adsorbent material although these substances are chosen by way of illustration only.

The gaseous mixture, for example, smelter gases containing sulphur dioxide should first be cleaned to remove fumes and dust. Any standard method of cleaning may be employed, the details of which form no part of the present invention. The cleaned gas may then enter a compressor where it is compressed to such a pressure that the adsorbable constituent, in this case sulphur dioxide, has a partial pressure above atmospheric but below its own critical pressure. In the case of sulphur dioxide, a partial pressure of about two atmospheres has been found satisfactory. The heat of compression may be removed by cooling coils or other suitable means and the mist composed of water vapor may be partly removed by passing the gas through a suitable separator.

Gases from the separator are passed through an auxiliary or guard tube containing a comparatively small amount of adsorbent material. The material in the guard tube serves to adsorb moisture and water vapor which may be present in the gas stream, as well as various impurities which would contaminate the adsorbent bed.

In practical operation two guard tubes will be required. The gas will be passed through one tube until the adsorbent material becomes saturated with moisture. This tube is then by-passed and the gases pass through the second tube while the first tube is activated, as by heating to remove the water vapor. The material may be heated either by passing a hot gas through the adsorbent directly or by passing a heated gas or steam through pipes imbedded in the material.

As the operation is continued the guard tubes are alternated, one tube being activated while the other tube is adsorbing moisture and impurities. In case the material should become fouled with dust and fumes, fresh material can be substituted at no great cost since the quantity thereof is small as compared to that within the main adsorbent bed.

The gas may then enter the adsorption chamber which is pressure-tight except for a relief valve which is set to blow at the pressure selected for the adsorption. The stripped gases are thus vented continuously or intermittently through the relief valve. The stripped compressed gases may be utilized to perform external work in compressing fresh quantities of incoming gases.

When the adsorption part of the cycle is complete as evidenced by sulphur dioxide leaving the relief valve unadsorbed, the rich compressed gases are shunted to a second adsorber and the first adsorber is opened to the low pressure side of a compressor. The adsorbed gases are then liberated at reduced pressure and recovered.

The liberated gases may be cooled by suitable refrigerating coils to a temperature at which they may be readily liquefied by pressure. Suitable pressure may then be applied to bring the sulphur dioxide into the liquid state and the liquid allowed to flow by gravity into storage tanks.

Referring to the drawing, the apparatus for carrying on the present process is diagrammatically represented as comprising a compressor 1 including a cylinder 2 in which the incoming gases are compressed to the desired value. The gases are then passed through cooling pipes 3 and through separator 4 in which the mist or water vapor is largely separated. The gases are then passed into one of a pair of guard tubes 5 in which the remainder of moisture is removed together with various impurities, thence through adsorber 6 wherein the sulphur dioxide is adsorbed. The stripped gases, which are still under high pressure, are then passed through return pipe 7 to cylinder 8 on the compressor wherein they are utilized for furnishing a part of the required power.

Relief valve 9 determines the pressure in the entire system. Suitable valves 10 and 11 are included in the pipe line to the guard tubes 5 for enabling one of said tubes to be employed for adsorption purposes, while the other of said tubes is being reactivated by any desired means (not shown). Sulphur dioxide from the adsorber may be removed through pipe 12 to a suitable compressor and storage tank (not shown).

In accordance with the present invention, sulphur dioxide may be separated from the gaseous mixture as by means of silica gel and distilled from said gel without change in temperature. A greater efficiency is consequently obtained since a given weight of adsorbent will recover more sulphur dioxide per cycle than when changes in temperature are relied upon for the adsorption and desorption steps.

The provision of a guard tube prevents any moisture from being carried over into the main adsorber and consequently eliminates the necessity for reactivating the same. Since the process is normally carried out without appreciable temperature change and the necessity for heating for purposes of reactivation is eliminated, it is unnecessary to include heating pipes in the adsorbent bed. The material may be employed for adsorbent and desorbent cycles over an indefinite period of time with a consequent decrease in the cost of replacement as well as reduction in cost of installation.

Furthermore, injurious elements such as basic metallic salts contained in the smelter gases which are capable of impairing the adsorptive properties of the gel are effectively removed by the material within the guard tube. The gas need not be subjected to such thorough prior cleaning, since only the small amount of material in the guard tube becomes contaminated by the injurious elements and must be replaced.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

What is claimed is:

1. The method of separating gas from a gas mixture which comprises passing said mixture through a comparatively small bed of adsorbent material which is saturated with said gas, said material being capable of preferentially adsorbing moisture and impurities after it has been saturated with said gas, and thence passing the mixture through a second bed of adsorbent material which is capable of adsorbing the desired gas from the mixture.

2. The process of recovering sulphur dioxide from furnace gases which comprises passing said gases over a bed of material saturated with sulphur dioxide which is capable of differentially adsorbing moisture and impurities when so saturated, then passing said gas over a bed capable of adsorbing sulphur dioxide, continuing the passage through said first bed until it becomes saturated with moisture, then alternating to an auxiliary bed while the first bed is reactivated, continuing passage of said gases into the second bed until it becomes saturated with sulphur dioxide and then removing said second bed from the gas stream and desorbing sulphur dioxide therefrom.

3. The process of recovering sulphur dioxide from gas mixtures which comprises passing said mixture through a bed of material capable of adsorbing moisture when saturated with sulphur dioxide, continuing the passage therethrough until said bed is saturated with moisture and passing the gases from said first bed into a second bed capable of adsorbing sulphur dioxide and continuing the passage into the second bed until it becomes saturated with sulphur dioxide, then removing said second bed from the gas stream and recovering the sulphur dioxide therefrom.

4. The process of recovering a gas from gas mixtures which comprises passing said mixture through a bed of material capable of adsorbing moisture when saturated with gas, continuing the passage therethrough until said bed is saturated with moisture and passing the gases from said first bed into a second bed capable of adsorbing said gas and continuing the passage into the second bed until it becomes saturated with said gas, then removing said second bed from the gas stream and recovering said gas therefrom.

5. The process of recovering a gas from gas mixtures which comprises passing said mixture through a bed of silica gel saturated with said gas, continuing the passage therethrough until said bed is saturated with moisture and passing the gases from said first bed into a second bed of silica gel and continuing the passage into the second bed until it becomes saturated with said gas, then removing said second bed from the gas stream and recovering said gas therefrom.

6. The process of recovering sulphur dioxide from furnace gases which comprises passing said gases through a bed of silica gel saturated with sulphur dioxide, continuing the passage therethrough until said bed is saturated with moisture and passing the gases from said first bed into a second bed of silica gel and continuing the passage into the second bed until it becomes saturated with sulphur dioxide, then removing said second bed from the gas stream and recovering the sulphur dioxide therefrom.

In testimony whereof, I have hereunto set my hand.

RUDOLPH LEONARD HASCHE.